Nov. 10, 1959 R. POUIT 2,912,189
JET PROPELLED AIRCRAFT WITH JET FLAPS
Filed Dec. 27, 1956

INVENTOR
Robert Pouit
BY
ATTORNEYS

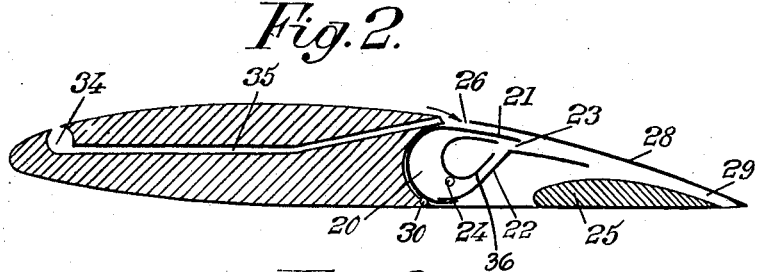
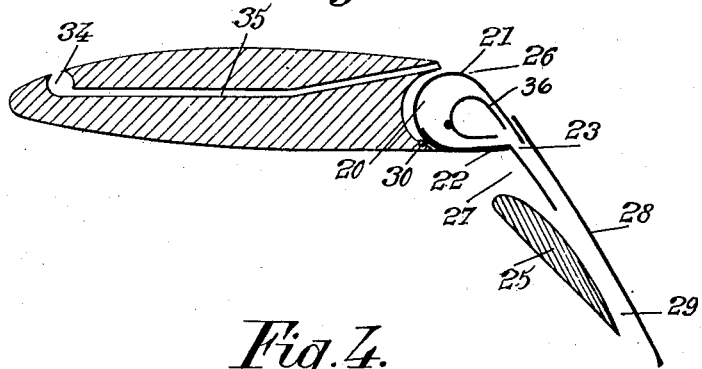
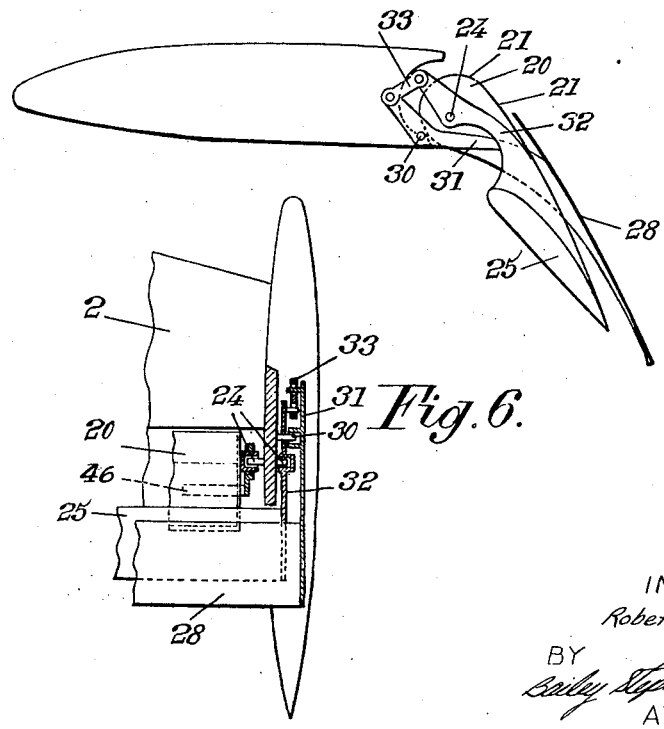

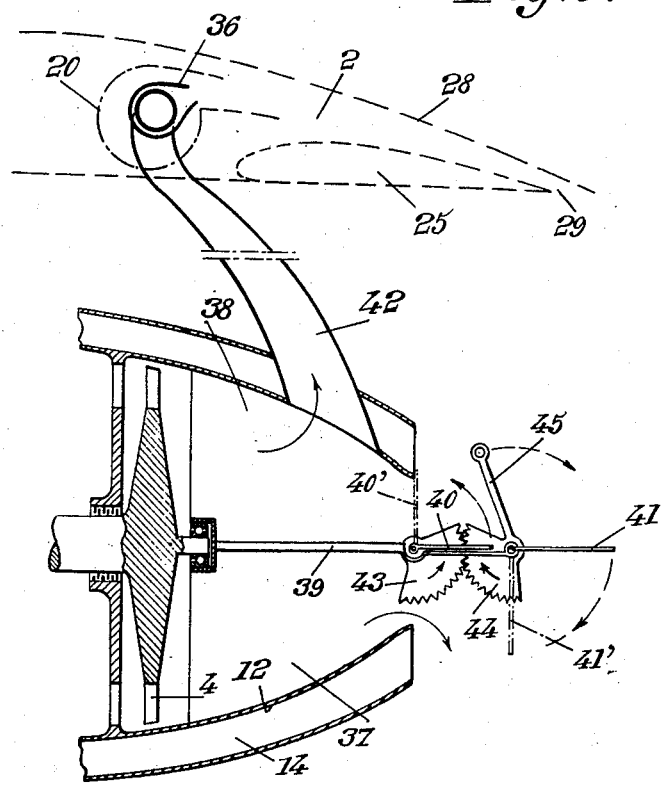

United States Patent Office 2,912,189
Patented Nov. 10, 1959

2,912,189

JET PROPELLED AIRCRAFT WITH JET FLAPS

Robert Pouit, Asnieres, France

Application December 27, 1956, Serial No. 630,801

Claims priority, application France December 29, 1955

12 Claims. (Cl. 244—15)

The present invention relates to aircraft having at least two main turbo-jet power plants arranged symmetrically on either side of a fore-and-aft plane of symmetry of the aircraft.

The chief object of my invention is to provide an aircraft of this kind which is better adapted to meet the requirements of practice than those existing at the present time and, in particular, which is capable of flying in straight line without calling for undue stress from the pilot when one of the two main power plants is stopped, for instance due to breakdown thereof.

In an aircraft such as that with which my invention is concerned, the air compressor of each power plant delivers an amount of air in excess of that used by the turbine and the jet nozzle of said power plant, and this excess of air is normally used to feed trailing edge nozzle means provided at the rear of the aircraft wing, preferably in the flaps thereof.

According to my invention, two emergency propulsion jet nozzles are provided symmetrically on either side of said plane of symmetry, and valve and conduit means are interposed in crosswise fashion between said power plant compressors and said emergency jet nozzles, whereby, in case of breakdown of one power plant, at least a portion of the air normally supplied to said trailing edge nozzle means by the compressor of the other power plant may be fed to the emergency jet nozzle located on the same side of said plane of symmetry as the power plant stopped by breakdown.

Other features of my invention will become apparent in the course of the following detailed description thereof.

A preferred embodiment of my invention will be hereinafter described with reference to the accompanying drawing, given merely by way of example and in which:

Fig. 1 diagrammatically shows in plan view elements of a jet aircraft, and in particular the power plant thereof.

Fig. 2 is a chordwise section of the wing of such an aircraft in flying position.

Fig. 3 is a view similar to Fig. 2 but with the flaps lowered.

Figure 1:
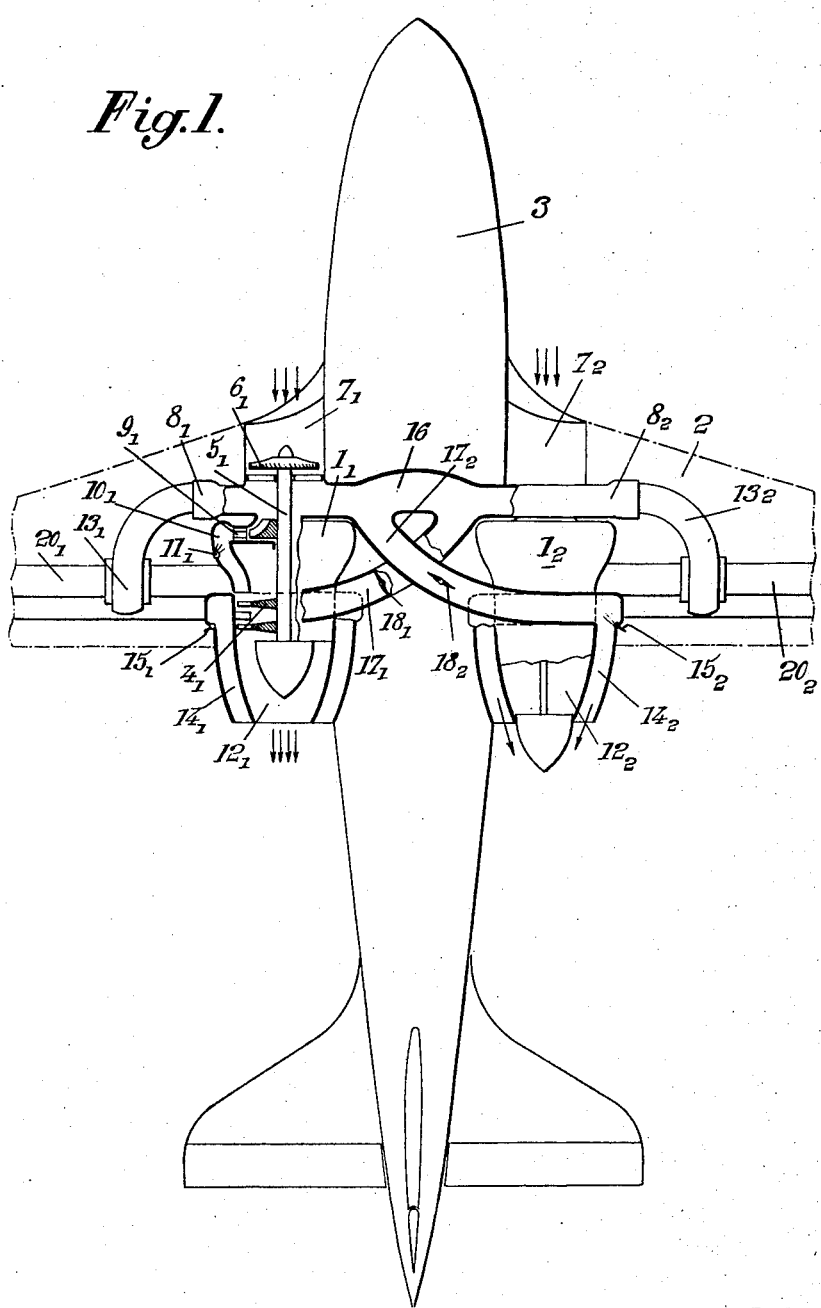

Fig. 4 diagrammatically shows the mechanical connections between the flap elements and the fixed portion of the wing.

Fig. 5 shows in two different positions a device for operating flaps mounted on the jet nozzle of a power plant, according to my invention.

Fig. 6 is a detail plan view showing the connection between the elements visible on Figs. 2, 3 and 4.

The aircraft shown by the drawings is supposed to have only two power plants $1_1$ and $1_2$ located on either side of the fore-and-aft plane of symmetry of the aircraft, that is to say on either side of the fuselage 3, said power plants being mounted on the wing 2 of said aircraft. The power plant on the left hand side is shown in section and that on the right hand side in plan view. The description of the parts on the left hand side of the plane of symmetry of the aircraft will apply to the elements located on the other side, which elements are designated by similar reference numerals. The power plant $1_1$ includes a turbine $4_1$ driving, through a shaft $5_1$, two compressor elements $6_1$ and $9_1$ in series. Compressor element $6_1$, which is a low pressure axial compressor element, receives air from the outside through an intake 7, provided with closing and adjustment means which are not shown on the drawing. This first compressor element delivers compressed air at relatively low pressure into a chamber $8_1$. The other compressor element, $9_1$, for instance of the centrifugal type, compresses at a high pressure a portion of the air present in chamber $8_1$ and discharges it into combustion chambers $10_1$ where fuel is fed through injectors $11_1$.

The high pressure combustion gases from said chambers are partly expanded through turbine $4_1$ and further expanded in a jet nozzle $12_1$ so as to form the high velocity jet of hot gases used for propulsion.

The excess of compressed air present in chamber $8_1$ is fed through a conduit $13_1$ to a distributing pipe $20_1$ which feeds this air to trailing edge nozzle means provided at the rear of wing 2, preferably in flaps carried by said wing (as will be hereinafter more fully described).

This is what takes place in normal flying conditions.

Each of the jet nozzles, such as $12_1$, is surrounded by a coaxial nozzle $14_1$. In the annular space between the main nozzle $12_1$ and the emergency nozzle $14_1$ there is provided a burner, such as $15_1$, by means of which fuel can be burned in the cold compressed air that may be supplied into said annular space from the compressor of the other power plant, as it will now be explained.

For this purpose, each of the chambers $8_1$ and $8_2$ is connected with a central common chamber 16 from which start two conduits $17_1$ and $17_2$ leading to annular emergency nozzles $14_1$, $14_2$, suitable valves $18_1$ and $18_2$ being provided in said conduits $17_1$ and $17_2$ so as to permit the flow of compressed air therethrough when so desired.

Thus, in case of breakdown of one of the main power plants, for instance power plant $1_2$, the intake $7_2$ of this power plant is closed by the above mentioned means (not illustrated on the drawing) and valve $18_2$ is opened so as to permit compressed air from the compressor element $6_1$ of power plant $1_1$ to flow into annular space $14_2$ where fuel is burned through injectors such as $15_2$. Therefore, a thrust is obtained on the right hand side, capable of balancing the thrust of the power plant $1_1$ still in action, and the aircraft keeps flying in straight line without requiring special piloting action.

The distributing conduits $20_1$ and $20_2$ are provided with means for adjusting their outflow toward the trailing edge of the means in such manner as to make it possible to reduce or even to stop this outflow when one of the valves $18_1$ and $18_2$ is opened to feed compressed air to the corresponding emergency jet nozzle.

If the outlet of the distributing air conduit such as $20_1$ is wholly closed, the whole of the excess of cold compressed air from generator element $6_1$ is fed to emergency nozzle $14_2$ the rate of feed of fuel burned at $15_2$ being adjusted so that the thrust of this emergency nozzle balances that of the main nozzle $12_1$.

I may also merely reduce the outflow of cold compressed air from air distributing conduit $20_1$, and in this case it will be necessary to increase the amount of fuel delivered through burners such as $15_2$ in order to obtain on the right hand side of the fuselage a thrust balancing that supplied by the main power plant through its nozzle $12_1$.

The means for adjusting or closing the outlets of distributing air conduits $20_1$ and $20_2$ will be hereinafter described in detail.

In normal flying conditions, that is to say when both of the power plants $1_1$ and $1_2$ are running normally, valves $18_1$ and $18_2$ are closed and the whole of the excess of compressed air supplied by compressor elements $6_1$ and $6_2$ is sent, through conduits $13_1$ and $13_2$, to air distributing pipes $20_1$ and $20_2$ to improve the flying conditions, that is to say to increase circulation around the wing and to provide some supplementary thrust.

In the following description, which now refers to Figs. 2 to 6, the reference numerals, although corresponding to those referred to, are without the indexes 1 or 2 as used up to now with reference to Fig. 1 to distinguish the parts located on the left hand side of the aircraft from those located on the right hand side.

Each air conducting pipe 20 is made of two portions, an upper one 21 and a lower one 22 capable of sliding in rotation about a common axis with respect to each other, said portions leaving between them an open slot 23 through which flows out the compressed air to be fed through the trailing edge nozzle means. Said air distributing pipes 20, which extend in the spanwise direction, are pivoted about an axis 24 at least substantially at right angles to the fore-and-aft plane of symmetry of the aircraft. The wing flaps are each constituted by two elements 25 forming the undersurface of the flap and 28 forming the upper surface thereof. Flap element 25 is pivoted about the same axis 24 as the air distributing pipe 20. Flap element 28 is pivoted to the fixed portion of the wing about an axis 30 parallel to axis 24. The leading edges of the flap elements are located at the rear of the axes about which they are pivoted, so that when the flap is lowered (the air distributing pipe 20 rotating together with the lower flap element 25), the slot 26 existing on the upper surface of the wing between the fixed portion thereof and element 28 is greatly enlarged. Advantageously a slot 27 is then opened between the under surface of the fixed portion of the wing and the flap under portion 25.

When the flap has been pivoted downwardly to its limit position so that the lower portion 22 of the air distributing pipe 20 has come to bear upon the lower wall of the fixed portion of the wing 2, the rounded portion of the upper part 21 of pipe 20 forms a curvilinear connection approximately bridging the gap 26 between the rear edge of the upper surface of the fixed portion of wing 2 and the front edge of the upper portion 28 of the flap.

In the normal flying position illustrated by Fig. 2, the compressed air distributed by pipe 20 through its slot 23 is fed into the jet nozzle 29 formed by the space between the lower flap element 25 and the upper flap element 28. When the flap is lowered, the pivoting of elements 25 and 28 takes place simultaneously owing to the provision of levers 32 and 31 pivoted respectively at 24 and 30 and of a connecting rod 33 interposed between said levers. The positions of these pivot axes are chosen so that, during this downward pivoting movement, the passage through nozzle 29 increases as the flap is rotating downwardly and more air is flowing into slots 26 and 27.

At suitable points of the upper surface of wing 2, for instance close to the leading edge thereof, I may provide suction slots such as 34 communicating with conduits 35 opening at the rear close to the rounded portion of pipe element 21.

Such a device works as follows:

In normal flying position, as illustrated by Fig. 2, the whole of the fixed portion of the wing and of flap elements 25 and 28 determines an airfoil section having the best possible characteristics, with a laminar flow of air along its outline, stability of this flow being achieved owing to the suction taking place through slots 26 and 34 due to the blowing air from the slots 23 of the distributing pipe 20 into the nozzles 29 provided between the portions 25 and 28 of the flaps.

The blowing action through said nozzles 29 supplies a propulsion component and also, due to the improved air circulation around wing 2, an increased lift.

When the flaps are lowered to their limit position, which is the case for instance when the aircraft is taking off or landing, the portions 21 of the distributing pipes 20 ensure a continuity of the upper wing surface between the rear edge of the fixed portion of the wing and the front edge of the flap portion 28. The air blown through slot 23 of pipe 20 exerts a suction on the boundary layer along the wall 21 of said pipe 20, thus enabling the air streams to be deflected downwardly toward the flap portion 28. If, as illustrated, slots such as 27 are opened on the under face of the wing, a portion of the air stream flowing along said under portion of the wing is fed into the trail edge nozzles 29, thus increasing the lift.

Due to the above mentioned increase of the cross-section of slot 29 as the flap is being pivoted downwardly, the maximum of efficiency is obtained.

This efficiency may be further increased by blowing out from pipe 20, in addition to the cold air from compressor element 6, hot gases from the main power plant nozzle 12 supplied through a feed pipe 36 disposed inside feed pipe 20 and rotating together therewith.

The additional blowing of hot gases collected from the main power plant is particularly advantageous when the aircraft is landing because, at this time, the horizontal thrust of the hot gases issuing from the main power plant nozzles should be reduced.

According to another feature of my invention, diagrammatically illustrated by Fig. 5, every main power plant nozzle 12 is divided into two chambers 37 and 38 by a partition 39 to which are pivoted flaps 40 and 41 which, under normal conditions, are disposed in the same plane as said partition 39 but which may be rotated in the directions of the arrows so that flap 40 closes at the rear the top chamber 38, whereas flap 41 deflects, when rotated in its position 41', the stream of hot gases flowing through chamber 37 into a downward direction. Furthermore the upper chamber 38 is connected, through a conduit 42 extending toward the front, with the above mentioned feed pipe 36 provided in wing 2. Thus, when flaps 40 and 41 are pivoted into positions 40' and 41', shown in dotted lines, the hot gases from chamber 38 are fed to distributing pipe 36 and the hot gases from chamber 37 are deflected downwardly. On the one hand, the horizontal thrust of the power plant is practically reduced to zero and the lift is increased due to the hot gases blown from distributing pipe 36 and to the impact on the ground of the hot gas jet deflected by flap 41.

The simultaneous rotation of flaps 40 and 41 is for instance obtained by means of two toothed sectors 43 and 44 meshing together and at least one of which is controlled by a lever 45, said sectors being rigid with said flaps 40, 41.

Preferably, the ratio of the flow rate of the cold compressed air fed to the flap jet nozzles 29 to the flow rate of the hot gases delivered by the main power plant jet nozzles 12 (which ratio essentially depends upon the pressure conditions in the compressors and the turbines) is adjusted so that, when flying at normal speed and altitude, the ratio of the thrust produced by the air flowing out through said flap jet nozzles 29 to the thrust produced by said hot gases flowing out from said main power plant jet nozzles is substantially equal to the ratio of the respective drags of the wing and of the fuselage (together with the tail unit) of the aircraft.

Adjustment of the outflow from air distributing pipe 20 is obtained as visible on Figs. 2, 3 and 6 by rotating parts 21 and 22 with respect to each other about axis 24, part 22 being for instance carried by arms 46 carried by a sleeve mounted on pivot 30. Thus the slot 23 between said parts 21 and 22 can be adjusted to the desired value or even wholly closed.

With the arrangement above described, it is possible to increase the lift to drag ratio of the aircraft and to improve safety by reducing the taking off and landing speeds. Of course, the main increase from the point of view of safety is due to the fact that, even in case of breakdown of one of the power plants, the thrust supplied by the other can be balanced with respect to the fore-and-aft plane of symmetry of the aircraft by the thrust supplied by an emergency nozzle.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An aircraft which comprises, in combination, a wing, at least two main jet power plants mounted on said wing on opposite sides of the fore-and-aft plane of symmetry thereof and at equal distances from said plane respectively, trailing edge nozzle means incorporated in said wing, said nozzle means running along at least a substantial portion of the span of said wing and opening rearwardly from the trailing edge thereof, means for adjusting the delivery of said trailing edge nozzle means, two rearwardly opening emergency jet nozzles mounted on said wing on opposite sides of said plane of symmetry and at equal distances therefrom respectively, each of said main jet power plants including a compressor having two outlets and at least one combustion chamber, conduit means connecting one outlet of the compressor of each power plant with the combustion chamber of said last mentioned power plant and the other outlet with said trailing edge nozzle means, two emergency conduit means each interposed between the second mentioned outlet of the compressor of one of said power plants and the emergency jet nozzle located on the opposite side of said plane of symmetry from said last mentioned power plant, and valve means in said emergency conduit means, whereby, in case of breakdown of one power plant, said valve means located in the emergency conduit means leading from the compressor of the other power plant may be opened to feed compressed air to the emergency jet nozzle located on the same side of said plane of symmetry as said power plant stopped by breakdown.

2. An aircraft which comprises, in combination, a wing including a fixed portion and at least one flap pivoted along the rear edge of said fixed portion, at least two main jet power plants mounted on said wing on opposite sides of the fore-and-aft plane of symmetry thereof and at equal distances from said plane respectively, trailing edge nozzle means incorporated in said flap, said nozzle means running along at least a substantial portion of the span of said flap and opening rearwardly from the trailing edge thereof, means for adjusting the delivery of said trailing edge nozzle means, two rearwardly opening emergency jet nozzles mounted on said wing on opposite sides of said plane of symmetry and at equal distances therefrom respectively, each of said main jet power plants including a compressor having two outlets and at least one combustion chamber, conduit means connecting one outlet of the compressor of each power plant with the combustion chamber of said last mentioned power plant and the other outlet with said trailing edge nozzle means, two emergency conduit means each interposed between the second mentioned outlet of the compressor of one of said power plants and the emergency jet nozzle located on the opposite side of said plane of symmetry from said last mentioned power plant, and valve means in said emergency conduit means, whereby, in case of breakdown of one power plant, said valve means located in the emergency conduit means leading from the compressor of the other power plant may be opened to feed compressed air to the emergency jet nozzle located on the same side of said plane of symmetry as said power plant stopped by breakdown.

3. An aircraft according to claim 1, said main power plants including respective jet nozzles, each of said emergency jet nozzles being disposed coaxially around each of said main power plant jet nozzles, whereby air is delivered by said emergency conduit means to the annular space between said two last mentioned nozzles.

4. An aircraft according to claim 1 further including a fuel injector opening into each of said emergency nozzles, whereby the air fed to said last mentioned emergency nozzle can be heated by combustion of fuel fed by said injector.

5. An aircraft according to claim 1 which comprises, to feed air from the second mentioned outlet of each of said compressors to said trailing edge nozzle, an air distributing conduit extending spanwise inside said wing and provided with an adjustable slot opening rearwardly opposite the inlet of said trailing edge nozzle means.

6. An aircraft which comprises, in combination, a wing, at least one jet power plant mounted on said wing, said wing including a fixed portion and at least one flap pivoted thereto, along the rear edge of said wing fixed portion trailing edge, nozzle means incorporated in said flap, said nozzle means running along the span of said flap and opening rearwardly from the trailing edge thereof, an air distributing pipe extending spanwise in said flap, said distributing pipe being provided with a discharge slot running opposite the inlet of said nozzle means, means for feeding compressed gas from said power plant to said distributing pipe, said gas distributing pipe being pivotable with respect to said wing fixed portion together with said flap, means forming a curved surface extending, when said flap is lowered, in the gap between the rear edge of the upper surface of said wing fixed portion and the front edge of the upper surface of said flap so as to guide air streams from said first mentioned edge to said second mentioned edge, the under surfaces of said flap and said wing fixed portion being arranged so that, in the lowered position of said flap, a slot is opened between the rear edge of the under surface of said wing fixed portion and the front edge of the under surface of said flap.

7. An aircraft according to claim 6 in which said wing fixed portion is provided in its upper surface and at the front thereof with a boundary layer suction slot communicating with the rear edge of said last mentioned upper surface.

8. An aircraft according to claim 6 in which said flap includes an upper element having its upper surface in line with the wing fixed portion upper surface when said flap is in normal flight position, and a lower element having its under surface in line with the wing fixed portion under surface when said flap is in normal flight position, said two flap elements being at a distance from each other to form between them said trailing edge nozzle means, said two flap elements being pivoted to said wing fixed portion about two respective parallel axes disposed so that, in the lowered position of the flap, said slot is opened in the under surface of the wing between the rear edge of said fixed portion and the front edge of said flap and the cross-section of the nozzle means formed between said flap elements is then increased to permit the flow therethrough, in addition to the gaseous fluid blown from said distributing pipe, of the air flowing along the wing under surface and running into said slot.

9. An aircraft which comprises, in combination, a wing, said wing including a fixed portion and at least one flap pivoted thereto, along the rear edge of said wing fixed portion trailing edge, nozzle means incorporated in said flap, said nozzle means running along the span of said flap and opening rearwardly from the trailing edge thereof, an air distributing pipe extending spanwise in said flap, said distributing pipe being provided with a discharge slot running opposite the inlet of said nozzle means, at least one jet power plant mounted on said wing, said power plant including air compressor means having two outlets and a combustion chamber in communication with one of said outlets, means for feeding compressed air from the other of said outlets to said distributing pipe, said gas distributing pipe being pivotable with respect to said wing fixed portion together with said flap, means forming a curved surface extending, when said flap is lowered, in the gap between the rear edge of the upper surface of said wing fixed portion and the front edge of the upper surface of said flap so as to guide air streams from said first mentioned edge to said second mentioned edge, and means for feeding hot gas from said jet power plant combustion chamber to the inlet of said trailing edge nozzle means.

10. An aircraft according to claim 9 in which said last mentioned means include a second slotted distributing pipe disposed inside said first mentioned one and parallel thereto.

11. An aircraft which comprises, in combination, a wing, said wing including a fixed portion and at least one flap pivoted thereto, along the rear edge of said wing fixed portion trailing edge, nozzle means incorporated in said flap, said nozzle means running along the span of said flap and opening rearwardly from the trailing edge thereof, an air distributing pipe extending spanwise in said flap, said distributing pipe being provided with a discharge slot running opposite the inlet of said nozzle means, at least one jet power plant mounted on said wing, said power plant including a jet nozzle, means for feeding hot gas under pressure from said power plant to said distributing pipe, said gas distributing pipe being pivotable with respect to said wing fixed portion together with said flap, means forming a curved surface extending, when said flap is lowered, in the gap between the rear edge of the upper surface of said wing fixed portion and the front edge of the upper surface of said flap so as to guide air streams from said first mentioned edge to said second mentioned edge, means forming a communication between said power plant jet nozzle and said distributing pipe, and means for at least partly closing the outlet of said power plant jet nozzle, whereby at least a portion of the hot gas flowing through said power plant jet nozzle is sent to said distributing pipe.

12. An aircraft which comprises, in combination, a wing, said wing including a fixed portion and at least one flap pivoted thereto, along the rear edge of said wing fixed portion trailing edge, nozzle means incorporated in said flap, said nozzle means running along the span of said flap and opening rearwardly from the trailing edge thereof, an air distributing pipe extending spanwise in said flap, said distributing pipe being provided with a discharge slot running opposite the inlet of said nozzle means, at least one jet power plant mounted on said wing, said power plant including a jet nozzle, means for feeding hot gas under pressure from said power plant to said distributing pipe, said gas distributing pipe being pivotable with respect to said wing fixed portion together with said flap, means forming a curved surface extending, when said flap is lowered, in the gap between the rear edge of the upper surface of said wing fixed portion and the front edge of the upper surface of said wing fixed portion and the front edge of the upper surface of said flap so as to guide air streams from said first mentioned edge to said second mentioned edge, a horizontal partition dividing said power plant jet nozzle into two chambers, an upper one and a lower one, a conduit connecting said upper chamber with said gas distributing pipe, two flaps carried by said partition at the rear end thereof, said last mentioned flaps being normally in line with said partition, and means for pivoting said last mentioned flaps into positions transverse to said partition so as to close said upper chamber and to deflect in the downward direction the gases flowing through said lower chamber.

References Cited in the file of this patent

UNITED STATES PATENTS 2,453,721    Mercier _____ Nov. 16, 1948

FOREIGN PATENTS 1,107,311    France _____ Oct. 3, 1955